United States Patent
Perlman

Patent Number: 6,125,259
Date of Patent: Sep. 26, 2000

[54] INTELLIGENT AND USER FRIENDLY CHANNEL UP/DOWN CONTROL

[75] Inventor: William Perlman, Ashfield, Mass.

[73] Assignee: OKTV, Inc., Cambridge, Mass.

[21] Appl. No.: 08/643,992

[22] Filed: May 7, 1996

[51] Int. Cl.$^7$ ...................................................... H04N 7/16
[52] U.S. Cl. ............................................. 455/6.2; 348/5.5
[58] Field of Search ................................. 348/5.5, 10, 12, 348/13, 7, 732, 731, 725, 734, 460, 461, 465, 468, 473; 455/6.2, 6.3; H04N 7/16, 7/173, 7/167

[56] References Cited

U.S. PATENT DOCUMENTS

| | | |
|---|---|---|
| 4,228,543 | 10/1980 | Jackson . |
| 4,232,396 | 11/1980 | Grimes . |
| 4,510,623 | 4/1985 | Bonneau et al. ......................... 348/5.5 |
| 4,706,121 | 11/1987 | Young . |
| 4,718,107 | 1/1988 | Hayes . |
| 4,768,229 | 8/1988 | Benjamin et al. . |
| 4,792,972 | 12/1988 | Cook, Jr. ................................. 348/5.5 |
| 4,888,796 | 12/1989 | Olivo, Jr. . |
| 4,930,158 | 5/1990 | Vogel . |
| 4,930,160 | 5/1990 | Vogel . |
| 5,001,554 | 3/1991 | Johnson et al. ......................... 348/5.5 |
| 5,033,085 | 7/1991 | Rew . |
| 5,038,211 | 8/1991 | Hallenbeck . |
| 5,046,093 | 9/1991 | Wachob .................................. 348/5.5 |
| 5,172,111 | 12/1992 | Olivo, Jr. . |
| 5,200,822 | 4/1993 | Bronfin et al. . |
| 5,253,066 | 10/1993 | Vogel . |
| 5,270,822 | 12/1993 | Choi . |
| 5,371,795 | 12/1994 | Vogel . |
| 5,382,983 | 1/1995 | Kwoh et al. . |
| 5,418,853 | 5/1995 | Kanota et al. . |
| 5,583,576 | 12/1996 | Perlman et al. ......................... 348/5.5 |
| 5,758,258 | 5/1998 | Shoff et al. ............................. 348/5.5 |

*Primary Examiner*—Chris Grant
*Attorney, Agent, or Firm*—Frommer Lawrence & Haug LLP; William S. Frommer

[57] ABSTRACT

A technique for selectively inhibiting television receiving apparatus from displaying those television channels which are not authorized for viewing, such as unsubscribed television channels and channels with programs which satisfy predetermined content ratings criteria. Television channel information associated with television channels that are receivable by the television receiving apparatus, such as rating data representing the contents of the programs on the television channel, is obtained. A rating code representing the content ratings criteria of those channels which a viewer wishes to inhibit from being displayed also is obtained. When either channel up or channel down buttons are operated by the viewer, the rating data associated with the next television channel is compared with the rating code to determine if that television channel satisfies the predetermined content ratings criteria. If so, the channel is blocked and another channel having rating data which do not satisfy the predetermined content ratings criteria then is selected and the program broadcast thereon is displayed to permit the viewer to watch channels broadcasting acceptable television programs.

9 Claims, 4 Drawing Sheets

INTELLIGENT AND USER FRIENDLY CHANNEL UP/DOWN CONTROL

BACKGROUND OF THE INVENTION

This invention relates to selectively inhibiting television receiving apparatus from displaying programs broadcasted on unauthorized (unsubscribed) television channels or programs which satisfy predetermined content ratings criteria and, more particularly, to a technique for blocking the display of a television program having undesirable content, such as violence, nudity, etc., while displaying acceptable television programs that could be received as an alternative in place of the undesired program.

Techniques have been proposed heretofore to permit viewers to selectively enable and disable television receiving apparatus to prevent undesirable television programming from being received and/or displayed. With the introduction of what is known as an electronic program guide (EPG), television program information which identifies the individual television programs that are transmitted over available broadcast channels, together with the time of day that each such program is broadcasted, now can be transmitted to television receivers, either by cable transmission, direct satellite broadcast transmission or conventional over-the-air transmission.

EPG data may be transmitted over a separate transmission channel, received by an EPG tuner tuned to that channel and stored for selective display on, for example, the display screen of a television receiver whenever a viewer wishes to retrieve and view such EPG data. The EPG tuner and storage device may be incorporated into a conventional television receiver or into a decoder of the type typically used in cable television or direct satellite broadcast systems. Such decoders or converters are known and, consistent with industry usage, are referred to herein, as set-top converters.

It often is desirable, and several systems heretofore have been proposed, to selectively block the reception and/or display of television channels due to, for example, the content of the programs on such channels. For example, parents often wish to prevent the reception of television channels broadcasting television programs that are of a violent nature or that contain explicit nudity, or are obscene or otherwise repugnant. Such parental lock-out systems employ a complete blocking technique which serve to block entire broadcast channels. That is, the reception or display of television program that are broadcast on a particular channel is totally prevented. In other systems using a selective blocking technique, the reception of television programs on particular channels broadcast during certain times of the day is inhibited. The television receiver may be tuned to that broadcast channel at certain times; but during late evening hours, for example, when the content of the television programs broadcast on that channel is unsuitable to be observed by children, the reception or display of that broadcast channel is blocked.

It is desirable to utilize EPG data to assist in automatically blocking the display of television channels broadcasting certain types of television programs or in blocking the display of television channels that are scrambled but for which the subscriber is not authorized to descramble. The present invention proceeds upon the desirability of "weighting" each program broadcast on each television channel relative to a standard and then selectively enabling television receiver apparatus to display the program broadcast on that channel if its "weight" is sufficient. Stated otherwise, the present invention proceeds in accordance with rating criteria which, for example, provides a numerical value of the degree of violence, nudity, obscenity, etc. for each program on each television channel. Such rating criteria, or data, is expected to be transmitted as part of the EPG data and, thus, is readily available for comparison with a viewer's own determination of whether that rating data exceeds the user's own rating code.

OBJECTS OF THE INVENTION

Therefore, it is an object of the present invention to provide a technique by which television receiving apparatus is selectively inhibited from displaying programs broadcast on those television channels which a user subjectively determines are undesirable.

Another object of this invention is to provide a technique as aforesaid, which automatically displays a television program which is acceptable to the viewer and which can be received whenever the viewer operates a channel up or channel down buttons to select another channel.

A further object of this invention is to provide a technique as aforesaid, wherein a list of acceptable television channels is generated (i.e., those channels which are broadcasting acceptable programs), which can be used to quickly search for another channel broadcasting desirable programs when a viewer operates the channel up or channel down (channel selection) button.

An additional object of this invention is to selectively inhibit the display of those television channels which are not authorized for viewing.

Various other objects, advantages and features of the present invention will become readily apparent from the ensuing detailed description, and the novel features will be particularly pointed out in the appended claims.

SUMMARY OF THE INVENTION

In accordance with this invention, television receiving apparatus is selectively inhibited from displaying those television channels which are unacceptable or which are not authorized for viewing. As described herein, an unacceptable television channel is one which broadcasts a television program that satisfies predetermined content ratings criteria, that is, those television channels broadcasting television programs which are identified as having high levels of violence, nudity, obscenity or other undesirable content. Television program information associated with television programs receivable on the television channels that are transmitted by the source during a selected time interval, such as during a particular half hour, hour, two hours, day or week, are receivable by the television receiving apparatus. This television program information represents the channels on which different television programs are received and rating data representing the content of those programs. For example, the rating data may be a numerical value which represents the amount of violence, nudity, obscenity, etc., of a respective program. A rating code representing the content ratings criteria of programs which the viewer wishes to inhibit from being displayed is pre-stored. As an example the rating code likewise may be a numerical value which is compared to the rating data associated with the television program that is selected for display when a channel up or a channel down button is operated by the viewer. If the rating data of that television program satisfies the predetermined content ratings criteria, for example, if the rating data is equal to or greater than the pre-stored rating code, the television receiving apparatus is inhibited from displaying the selected television program. The television channel broadcasting that unacceptable television program is not completely blocked, but it is selectively blocked to prevent the television receiving apparatus from displaying those undesirable programs broadcast on that channel. Additionally, another program, then being broadcasted on another television channel, and having rating data which do not satisfy the predetermined content ratings criteria but which, nevertheless, can be viewed in place of the program on the selected television channel which is inhibited is automatically displayed. As a preferred feature of the present invention, the rating data, which represents the content of a program, identifies the frequency of occurrence and level of intensity of predetermined acts in that television program. For example, if acts of intense violence occur often throughout a particular television program, the rating data associated with that television program is relatively high.

In a preferred embodiment, the television program information is transmitted from a source to the television receiving apparatus includes a channel rating data for the entire television channel, and not simply for each program transmitted on that channel. For example, the rating data may be a numerical value which represents the amount of violence, nudity, obscenity, etc., on a respective channel. It will be appreciated, therefore, that the rating data represents the average frequency of occurrence and average level of intensity of predetermined acts. Although, the present invention contemplates the transmission of the rating data from a source, it will be appreciated that rating data can be determined by the television receiving apparatus from the television program information. For example, rating data of a particular channel may be derived by averaging the numerical rating data of those television programs broadcast on that channel during a selected time interval, such as during a particular day, week, or month. A channel rating code representing the content ratings criteria of channels which the viewer wishes to inhibit from displayed is pre-stored. If the rating data for that entire television channel satisfies the predetermined content ratings criteria, for example, if the rating data is equal to or greater than the pre-stored rating code (representing a threshold level of the frequency of occurrence and level of intensity of predetermined acts), the television receiving apparatus is inhibited from displaying the selected television channel for the duration of the selected time interval. The television channel is completely blocked, thus preventing the television receiving apparatus from displaying any television programs broadcast on that channel regardless of the rating data associated with the individual programs on that channel. Additionally, another channel having rating data which do not satisfy the predetermined content ratings criteria is automatically selected; and the television program then being broadcasted on that selected channel is automatically displayed.

In accordance with another aspect of this invention, television receiving apparatus is selectively inhibited from displaying those channels which are not authorized for viewing. As described herein, a television channel cannot be displayed until it has been previously authorized for viewing by either the viewer (e.g., parental lock-out) or the commercial television broadcast/distribution systems provider (e.g., enablement of "premium channels" or particular programs in pay-per-view applications), or both. For example, a viewer may wish to inhibit the display of channels broadcasting television programs which contain unacceptable material, such as excessive violence, nudity, obscenity, etc. Additionally, another program, then being broadcasted on another television channel that is authorized for viewing, can be automatically viewed in place of the program on the selected television channel which is inhibited.

In accordance with yet another aspect of this invention, information identifying television programs which the user is authorized to view is stored as a list which is produced by either comparing the rating data associated with programs broadcasted on a television channel to the predetermined content ratings criteria described hereinabove or reading the authorization status associated with programs broadcasted on a television channel to determine if the television programs receivable on that channel are acceptable or authorized to be viewed. If they are, the television channel is added to the list and the aforementioned steps are repeated for the next channel. The resulting list then is used by the television receiving apparatus to quickly search for the next authorized television channel when a viewer operates the channel up or the channel down button to select another channel. Also, the resulting list can be organized to modify the order in which the authorized channels are presented to the viewer when channel up or channel down buttons are operated.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF PREFERRED EMBODIMENTS

Figure 1:
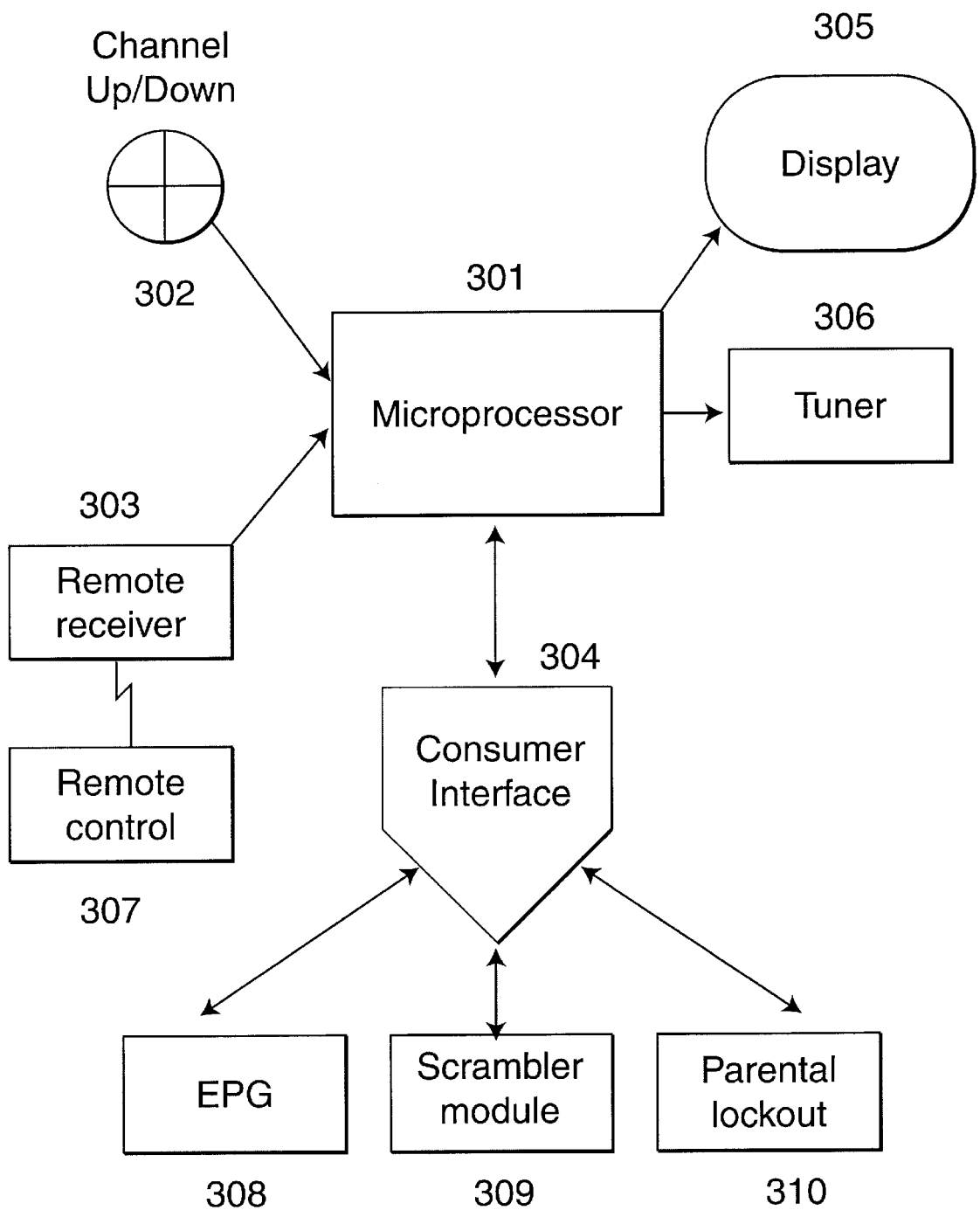
FIG. 1 is a block diagram showing the incorporation of the present invention in television receiving apparatus.

The present invention is readily implemented by presently available television receiving apparatus and electronic components. The invention finds ready application in virtually all commercial television broadcast/distribution systems, including over-the-air broadcasts, wired cable transmission systems and direct satellite broadcast systems. As is conventional, set-top converters typically are used to receive and decode television programs that are transmitted by cable systems or by direct satellite broadcast systems. Normally, such set-top converters are not needed to decode television programs that are transmitted by over-the-air systems. Set-top converters, like other television receiving devices, include tuning circuits (either analog or digital) which are operable to tune to any one of the different broadcast channels that may be received thereby. For example, if the set-top converter is used in a cable transmission system over which 25 different channels of television programming are transmitted, the tuning circuitry included in the converter is adapted to select any one of such 25 channels. Similarly, if the set-top converter is provided in a direct satellite broadcast system over which 150 different broadcast channels of television programming are received, the tuning circuitry included in the converter is adapted to select any one of those 150 different channels. The tuning circuitry included in conventional over-the-air television receiving devices is, of course, adapted to select any of the over-the-air channels that normally are transmitted.

The present invention contemplates the transmission of electronic program guide (EPG) data of the type that presently is available. Typically, such EPG data is transmitted on a predetermined broadcast channel separate and apart from the broadcast channels over which television programming is transmitted. However, EPG data that is multiplexed with television programming likewise may be received and detected. The former transmission of EPG data is known as out-of-band transmission; and the present discussion refers to such out-of-band transmission in over-the-air broadcast systems, cable distribution systems and direct satellite broadcast systems. In one embodiment, the EPG data includes the following information for each television program that is transmitted: the channel over which that television program is transmitted (i.e., the channel number); the time of day at which the television program is transmitted (e.g., start time); the duration of the television program (i.e., program length); the name of the television program; the type of the television program (e.g., movie, comedy, special, weekly series, etc.); the genre of the television program (e.g., drama, comedy, sporting event, action, etc.); and a description of the television program (e.g., the names of the starring performers, a brief summary of the subject matter of the television program, etc.). In addition to the foregoing information included in the EPG data, it is a feature of the present invention also to include rating data which represents the content of each program transmitted on that television channel. For example, the rating data may be a numerical value which represents the acceptability of the television program to the viewer. As an analogy with the current motion picture rating designations G, PG, PG-13, R and X, the rating data may exhibit ranges of progressively increasing weight with a range in the lowest weight corresponding to G-rated programs and the range having the highest weight corresponding to X-rated programs. A particular value within a range may be thought of as corresponding to the relative degree of acceptability/unacceptability of the television programs. It also is contemplated that rating data for the entire television channel, and not simply for each program transmitted on that channel, may be provided. For example, if a television channel transmits television programs containing a modest degree of violence that occur infrequently, the rating for that channel (or of the respective programs) may be relatively low. However, if that television channel transmits television programs containing intense violence that recurs frequently, the rating data is relatively high. It will be appreciated, therefore, that the rating data represents the average frequency of occurrence and average level of intensity of predetermined acts (e.g., acts of violence or nudity or profanity) in television programs transmitted on the television channel.

An example of EPG data containing the aforementioned rating data may be constructed as follows:

TABLE 1

| FIELD NAME | SIZE IN BYTES |
| --- | --- |
| Channel number | 3 |
| Start time | 5 |
| Program length in minutes | 3 |
| Program name | 50 |
| Program type | 10 |

TABLE 1-continued

| FIELD NAME | SIZE IN BYTES |
| --- | --- |
| Program genre | 10 |
| Description | 256 |
| Rating data | 1 |

Turning now to FIG. 1, there is illustrated a block diagram of television receiver apparatus which incorporates the present invention. The apparatus illustrated in FIG. 1 may be included in a set-top converter, a television receiver, a video recorder or other conventional apparatus typically used to receive and cause the display of television pictures. A remote control unit 307 is adapted to transmit conventional control signals to the television receiving apparatus for controlling various functions such as channel selection, volume control, brightness, contrast, color adjustments, etc. Such control signals may be transmitted by infra-red transmission; and in that event the remote control unit includes an IR transmitter (not shown) and the television receiving apparatus includes a remote IR receiver 303. Alternatively, remote control unit 307 and remote IR receiver 303 may be omitted and the aforementioned control signals may be generated simply by operating corresponding controls directly on the television receiving apparatus (e.g., channel selector 302, a volume adjustment button, a picture control button and the like).

The control signals, whether received by remote IR receiver 303 or generated by control elements provided directly on the television receiving apparatus, such as channel selector 302, are coupled to a microprocessor 301 which controls the operation of a tuner 306 to tune to a selected television channel received at the input of the tuner. For example, the microprocessor may control tuner 306 to tune to a particular broadcast frequency over which a television program is transmitted. Alternatively, the microprocessor may control tuner 306 to tune to a particular digital channel (as in direct satellite broadcast transmission) over which the television program is transmitted. The video signals which constitute the television program broadcast over the selected channel are supplied to a display 305 whereat they are displayed to the viewer. It will be appreciated that display 305 includes the usual video processing circuitry normally provided in television receiving apparatus to permit a television picture (and accompanying audio information) to be displayed to a viewer. The foregoing operation is typical of television receiving apparatus.

An electronic program guide (EPG) unit 308 is adapted to receive EPG data transmitted thereto, for example, over a predetermined out-of-band channel. Such EPG data is extracted and written into a memory (not shown) included in EPG unit 308. For example, the EPG unit may include separating circuits tuned to the out-of-band channel for separating the EPG data. Other conventional data extraction techniques may be used. EPG unit 308 thus stores the EPG data.

EPG data is transmitted to EPG unit 308 periodically and contains the data represented by Table 1 for each and every television program that may be received by the television receiving apparatus shown in FIG. 1 during a selected time interval. For example, if the television receiving apparatus is connected to a cable distribution system, the EPG data contains television program information associated with all of the available television programs in this cable distribution system. If the television receiving apparatus is coupled to a direct satellite broadcast system, the television program information included in the transmitted EPG data is associated with all of the television programs that are receivable by the television receiving apparatus over this direct satellite broadcast system. If the television receiving apparatus simply receives over-the-air broadcasts, the television program information associated with all of the transmitting television program transmitted into the reception area of this television receiving apparatus is included in the EPG data. Thus, EPG unit 308 stores the EPG data, including the rating data, associated with each television channel that can be received by the television receiving apparatus during the selected time interval. This time interval may be an hour, a number of hours, a day, a number of days, a week, a month or a longer time interval. Typically, the time interval is a week and EPG unit 308 thus stores television program information associated with all television programs that are receivable by the television receiving apparatus during that week.

When tuner 306 is tuned by microprocessor 301 in response to channel selection signals supplied thereto by, for example, remote IR receiver 303 or channel selector 302, the television program information associated with the selected channel is read from EPG unit 308 through a consumer interface 304 for the purpose of comparing the rating data included in that television program information to a predefined rating code that had been generated previously by the user of the television receiving apparatus.

For example, if the television receiving apparatus is included in a cable distribution network and tuner 306 is tuned to channel 25, the television program information stored in EPG unit 308 and associated with channel 25 is read and the rating data included in such television program information is compared to the rating code previously generated and stored in parental lock-out module 310. A similar retrieval from EPG unit 308 of the television program information associated with the channel to which tuner 306 is tuned is carried out if the television receiving apparatus is included in a direct satellite broadcast system or is adapted to receive over-the-air transmissions.

If the rating data retrieved from EPG unit 308 and associated with the television program that has been selected (e.g., when a channel up or channel down buttons on either channel selector 302 or remote control unit 307 is operated by the viewer) exceeds the rating code stored in parental lock-out module 310, thus indicating that the selected television channel is not acceptable, microprocessor 301 inhibits the program transmitted on that television channel from being shown on display 305, i.e. the microprocessor selectively blocks only those programs on that selected television channel that causes the selected television channel to be unacceptable to the viewer. Alternatively, the complete blocking technique causes microprocessor 301 to completely inhibit the display of every program transmitted on that television channel.

For example, the microprocessor may inhibit tuner 306 from supplying the video signals to display 305 or, alternatively, may inhibit display 305 from processing and displaying the video signals.

Alternatively, if the rating data does not exceed the predefined rating code, tuner 306 and display 305 are not inhibited but, rather, are enabled to display the television program that is received over this selected channel.

It will be recognized that the predefined rating code established and stored in parental lock-out module 310 by the viewer is intended to represent the content rating criteria of those television channels or those television programs which are acceptable. Stated otherwise, the rating code represents the content rating criteria of channels or programs which the viewer wishes to inhibit from being displayed.

In a complete blocking technique, if the value of the rating data retrieved from EPG unit 308 exceeds the predefined rating code retrieved from parental lock-out module 310, the television channel associated with that rating data thus satisfies the predetermined content rating criteria and display of every program transmitted on that television channel is completely inhibited. However, if the value of the rating data does not exceed the predefined rating code, the associated television channel does not satisfy the predetermined content rating criteria and every program transmitted on that channel thus may be displayed.

In a selective blocking technique, if the value of the rating data retrieved from EPG unit 308 exceeds the predefined rating code retrieved from parental lock-out module 310, the television program associated with that rating data thus satisfies the predetermined content rating criteria and display of that program is inhibited or the channel broadcasting that program is selectively inhibited. However, if the value of the rating does not exceed the predefined rating code, the associated television program does not satisfy the predetermined content rating criteria and that program thus may be displayed.

A scrambler module 309 is adapted to receive the authorization status code of all channels that are receivable by the television receiving apparatus, for example, over a predetermined out-of-band channel. Such authorization codes are extracted and written into a memory (not shown) included in scrambler module 309. For example, the scrambler module may include separating circuits tuned to the out-of-band channel for separating the authorization status codes. Other conventional data extraction techniques may be used. Scrambler module 309 thus stores the authorization status codes.

Authorization status code is transmitted to scrambler module 309 periodically for each and every television channel that may be received by the television receiving apparatus shown in FIG. 1 during a selected time interval or a "channel enable" command may be transmitted from the head-end controller to a particular subscriber when that subscriber specifically requests to have a particular channel authorized for viewing. For example, the subscriber may enter a suitable code (for example, a request for service) to a cable head-end controller and request that a particular channel or a particular program scheduled to be broadcasted on a particular channel (as in "pay-per-view" or "pay-per-play" applications) be authorized for viewing. This time interval may be an hour, a number of hours, a day, a number of days, a week, a month or a longer time interval.

In accordance with the present invention, it is desirable to automatically select another acceptable television channel that can be received during the same time interval as the unacceptable television channel which had been selected. For example, if tuner 306 is tuned to channel 25 at 8:00 p.m., but the television program broadcast over channel 25 at 8:00 p.m. is not acceptable by reason of the fact that the rating data associated with this television channel satisfies the predetermined content rating criteria represented by the predefined rating code, it is desirable to automatically tune to the next acceptable television channel transmitting at 8:00 p.m. to which the television receiving apparatus may be tuned.

As another advantageous feature of the present invention, EPG unit 308 is adapted to modify the order of the channel listings in response to a suitable viewer-generated command supplied to the microprocessor. This command may be transmitted by remote control unit 307, received by remote IR receiver 303 and supplied to microprocessor 301, whereupon the order of the channel listing in the EPG unit 308 is modified to allow the viewer to cluster his favorite channels at the top or beginning of the channel listing.

As yet another advantageous feature of the present invention, it is desirable to generate a list of acceptable channels from the television channel information stored in EPG unit 308 which can be used to search quickly for acceptable channels without interrogating EPG unit 308. For example, when it is determined that the television channel to which tuner 306 is tuned is unacceptable (as by comparing the rating data associated with that channel to the predefined rating code), microprocessor 301 may generate the list by selecting from EPG unit 308 another channel, such as the next adjacent channel, comparing the rating data associated with the other television channel, and if that other television channel does not satisfy the predetermined content rating criteria (that is, if its rating data does not exceed the predefined rating code), that other television channel is added to the list. The microprocessor then repeats this operation for the next adjacent channel, and so on, until all receivable channels have been examined. As a result, a list of only acceptable television channels is compiled; and this list is stored.

In one implementation of the foregoing, microprocessor 301 may periodically create the aforementioned list in the manner just described. For example, a list of acceptable television channels may be compiled at every half-hour.

In yet another implementation, the aforementioned list of acceptable television channels may be compiled periodically by microprocessor 301 and may be modified in response to a suitable viewer-generated command supplied to the microprocessor. This command may be generated by remote control unit 307, received by remote receiver 303 and supplied to microprocessor 301, whereupon the order of the acceptable channels in the compiled list is modified to allow the viewer to cluster his favorite channels at the top or beginning of the channel listing.

It will be appreciated that the television channel information included in the EPG data is changed periodically; and as individual items in the television channel information change, the contents of EPG unit 308 are updated accordingly. It is expected, therefore, that the list compiled by microprocessor 301 likewise will change periodically as the contents of EPG unit 308 are updated. As the rating data included in the television channel information changes, the determination of whether particular channels are acceptable likewise will change.

Although not described in detail, it will be appreciated, that microprocessor 301 may be constructed as a conventional microprocessor, such as a relatively inexpensive, small eight-bit controller or a powerful, high-speed microprocessor for example, a "486"-type microprocessor or Pentium microprocessor manufactured by Intel Corp.

Figure 2:
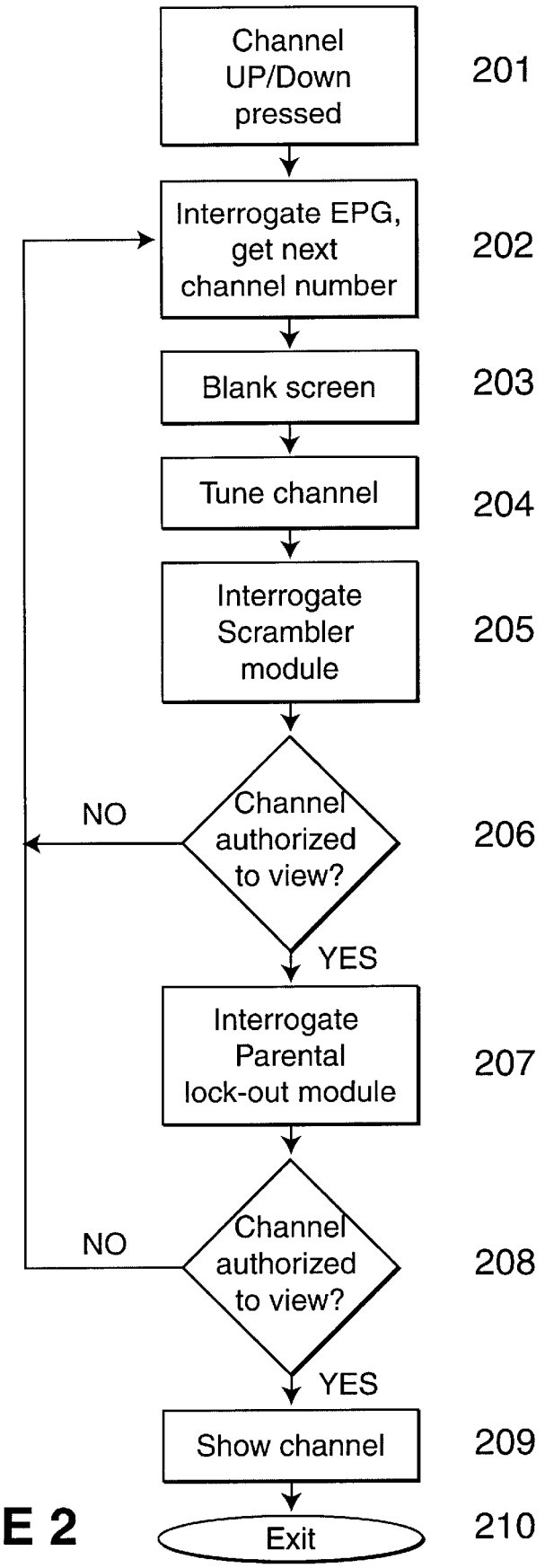
FIG. 2 is a flow chart which represents the manner in which the present invention selectively inhibits the display of unacceptable television programs.

The manner in which microprocessor 301 determines whether the selected television channel (or, more particularly, the program transmitted on that channel) is to be displayed or locked out (i.e. inhibited) is explained in conjunction with the flow chart shown in FIG. 2. It is assumed that EPG unit 308 stores the television channel information associated with all channels before a determination is made that a particular channel is acceptable. As mentioned above, such television channel information is transmitted periodically as EPG data.

When a channel up/down key is pressed on the remote control unit 307 or channel selector 302, as represented by instruction 201, the microprocessor stores the command and requests information from EPG unit 308 via consumer interface unit 304 for the next channel number, as represented by instruction 202. When the next channel number is received from EPG unit 308, the microprocessor issues a command to display unit 305 to blank the screen, as represented by instruction 203, and instructs tuner 306 to tune to the channel associated with the next channel number, as represented by instruction 204.

When a particular channel is selected for reception, the microprocessor requests the authorization status of the selected channel from scrambler module 309, as represented by instruction 205, and the microprocessor advances to inquiry 206 to determine if the selected channel is authorized for viewing (that is, the microprocessor inquiries as to whether the video signals on the selected channel are unscrambled). The authorization status of a particular channel may be selectively enabled by transmitting a suitable code (for example, a request for service) to a cable head-end controller (e.g., by placing a telephone call to the customer service representative of the cable distribution system) and by returning from the cable head-end controller a suitable authorization code to the scrambler module. An authorization code for a particular channel is required for example when a subscriber wishes to enable (authorize) the reception of a "premium channel" or a particular program as in pay-per-view applications. If inquiry 206 is answered in the negative, that is, if the selected channel is not authorized for viewing, the microprocessor returns to instruction 202 and the operations discussed above in conjunction with instructions 202–206 are repeated.

However, if inquiry 206 is answered in the affirmative, that is, if the selected channel is authorized for viewing, the microprocessor requests the pre-defined rating code from the parental lock-out module 310, as represented by instruction 207.

If the rating data associated with that television channel exceeds the pre-defined rating code, inquiry 208 is answered in the negative and the television channel is inhibited from being displayed. That is, the channel is blocked and not authorized for viewing. The microprocessor automatically searches for another channel that is authorized for viewing by returning to instruction 202 and the operations discussed above in conjunction with instructions 202–208 are repeated.

However, if the rating data does not exceed the predefined rating code, inquiry 208 is answered in the affirmative, the television channel is not blocked and the microprocessor enables the television program then being broadcast on the selected channel to be displayed. That is, the channel is authorized for viewing.

It will be appreciated that compiling a list of acceptable (authorized) television channels would enable the microprocessor to search quickly for an acceptable television channel without interrogating EPG unit 308. Microprocessor 301 compiles this list of acceptable television channels from the television channel information stored in EPG unit 308.

Figure 3:
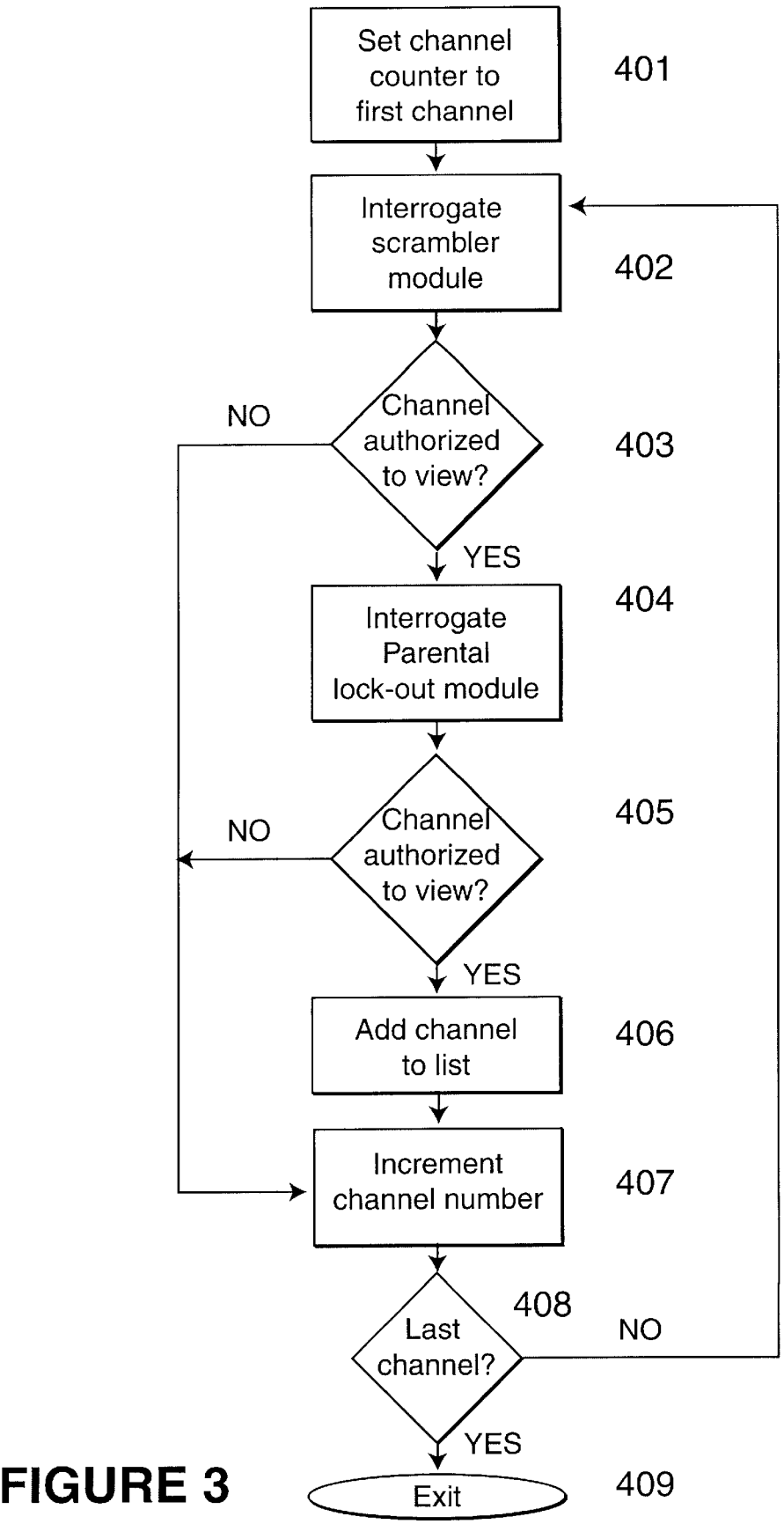
FIG. 3 is a flow chart which represents the manner in which the present invention creates and displays a list of authorized television channels that may be viewed by a viewer.

The list compiled by the microprocessor is generated periodically, as when the television channel information transmitted as EPG data to EPG unit 308 changes, or when a viewer changes the pre-defined rating code stored in parental lock-out module 310. Regardless of the conditions which trigger the compilation of the list, FIG. 3 is a flow chart which represents the manner in which that list is compiled.

Initially, a channel counter is set by instruction 401 to a channel number which, for example, may be the next highest channel number adjacent the particular channel to which tuner 306 presently is tuned. Alternatively, instruction 401 may set the channel counter to any arbitrary channel number. Then, instruction 402 is executed, wherein the microprocessor requests the authorization status of that channel from scrambler module 309. Inquiry 403 then is made to determine if the television channel is authorized. If inquiry 403 is answered in the negative, the television channel is not added to the list, instructions 404–406 are skipped, and the microprocessor advances directly to instruction 407 to increment the channel counter.

If inquiry 403 had been answered in the affirmative, then instruction 404 is executed, wherein the microprocessor requests the pre-defined rating code from the parental lockout module 310. Inquiry 405 then is made to determine if the television channel is acceptable (authorized). It is appreciated that this inquiry is determined by comparing the rating data associated with that channel with the pre-defined rating code. If inquiry 405 is answered in the affirmative, the television channel number associated with this channel is added to the list being compiled, as represented by instruction 406. Then, microprocessor 301 advances to instruction 407 to increment the channel counter.

If inquiry 405 had been answered in the negative, the television channel number associated with this channel is not added to the list, instruction 406 is skipped, and the microprocessor advances directly to instruction 407 to increment the channel counter.

After executing instruction 407, inquiry 408 determines if the channel to which the channel counter has been incremented is the last channel to be examined. If not, the microprocessor returns to instruction 402 and the operations discussed above in conjunction with instructions 402–408 are repeated. Eventually, the last channel is examined and inquiry 408 is answered in the affirmative. At that time, the microprocessor exits this routine and the list is completed. This list then may be modified by a viewer upon actuating a command, whereupon the order of the authorized channels in the compiled list is modified to allow the viewer to cluster his favorite channels at the top or beginning of this compiled list.

Figure 4:
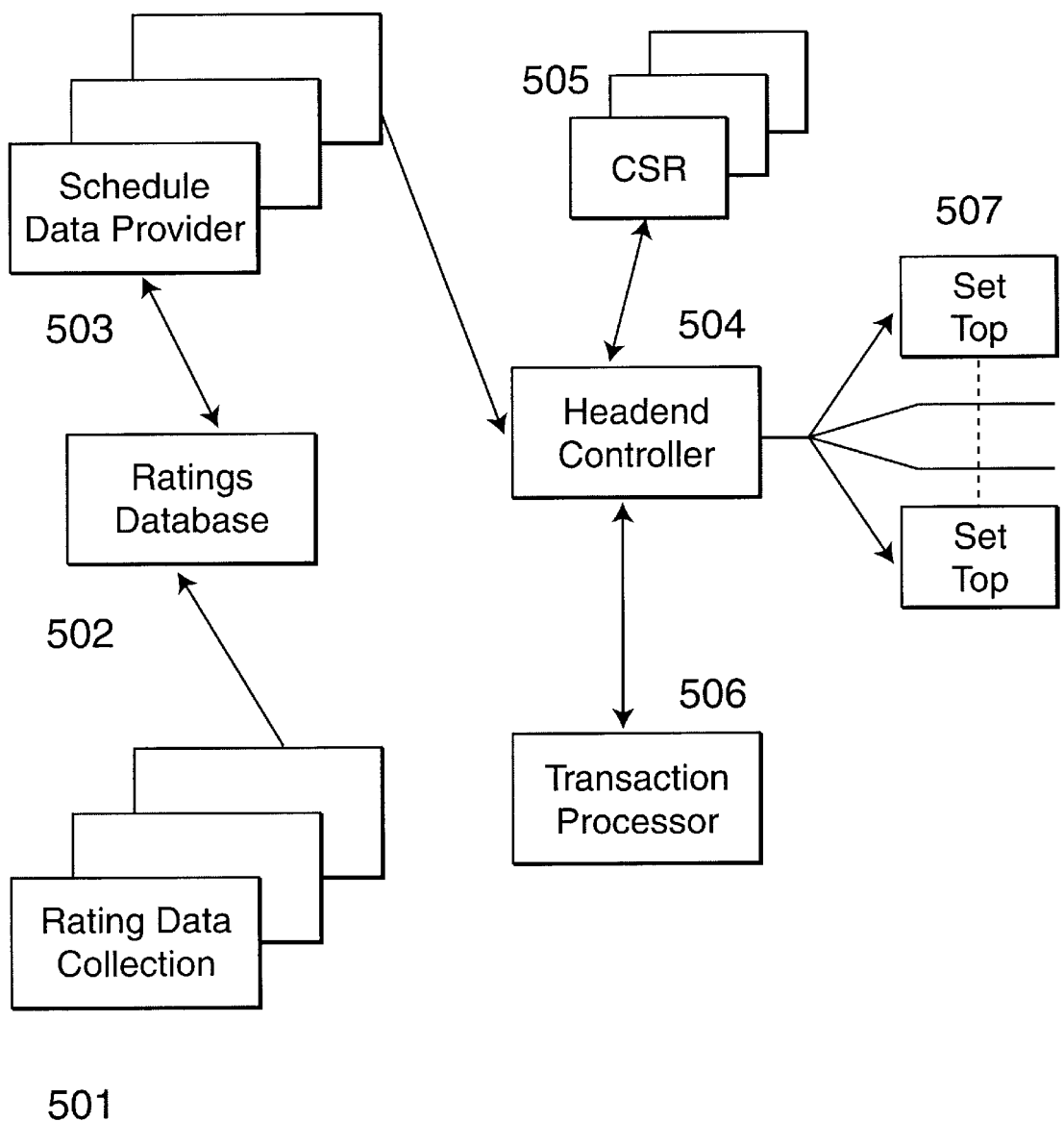
FIG. 4 is a block diagram representing the manner in which television program rating data is transmitted to television receivers, for example, in a cable distribution or direct satellite broadcast system.

The manner in which rating data is added to EPG data and transmitted to television receiving apparatus for storage in EPG unit 308 is schematically represented by the block diagram shown in FIG. 4.

It is expected that a panel of experts (or a number of selected viewers) will observe particular television channels which, to some viewers, may be unacceptable. For example, it need not be necessary for all television channels to be previewed. Rather, only those television channels which contain television programs with some violence or some profanity or some other predetermined acts which can be construed as unacceptable need be viewed. Such programs are retrieved from a store of programs having pre-selected rating data, such as those programs which correspond to the motion picture rating PG-13 and above.

The experts or viewers in this panel are expected to designate a rating data for each such television program as a function of the intensity of the predetermined acts (e.g. the level of intensity of violence) and the frequency of occurrence of those acts (e.g. the number of violent scenes which are present in the television program). A suitable numerical rating data is assigned to each such television program and an average rating data is then derived for each television channel transmitting such television programs. The derived rating data is stored in a rating data base 502. This database also includes the television channel information depicted in aforementioned Table 1.

The television channel information, including the rating data, stored in rating database 502 for all television channels, is compiled by a schedule data provider 503, which may be a suitable program schedule service, and transmitted to a head-end controller 504 in, for example, a cable distribution system. This EPG data may comprise daily program schedule data, weekly program schedule data or monthly program schedule data. The television channel information associated with each television channel that may be transmitted daily, weekly or monthly from head-end controller 504 to subscribers in the cable distribution system is transmitted periodically and, preferably over a channel distinct from those channels over which the television programs are transmitted. It will be appreciated that the transmission of EPG data from the schedule data provider to the head-end controller may be by way of conventional communication channels, such as telephone lines, optical channels, predetermined radio channels, or the like. Thus, EPG data is supplied to head-end controller 504 having, for example, the data construction shown in Table 1, for all of the television channels that may be transmitted from the head-end controller to cable subscribers during a predetermined time period, such as a week.

The television schedule data may identify those television channels that are transmitted for a greater period of time than simply one week, and it is contemplated that the EPG data stored at the head-end controller may represent those television programs that are to be transmitted over a 2, 3, 4 or more week period.

Head-end controller 504 transmits this television channel information over the cable distribution system to set-top converters 507. As discussed above, this EPG television program information may be transmitted periodically such that each set-top converter is supplied with current television program information. Information associated with a television program that has ended is deleted from such EPG data. Preferably, the set-top converters include a receiver (e.g., EPG unit 308) that always is tuned to the out-of-band channel over which the EPG data is transmitted from head-end controller 504. In this manner, whenever updated television program information is transmitted, such up-dated information is received and stored at the set-top converters.

In one embodiment, the channel authorization feature of the present invention is enabled by a suitable enable/disable control signal transmitted with the television channel information to the set-top converters by head-end controller 504 over the cable distribution network. A "channel enable" command may be transmitted from the head-end controller to a particular subscriber when that subscriber specifically requests to have this channel authorized for viewing. For example, the subscriber may telephone the customer service representative 505 of the cable distribution system and request that the "channel enable" command be transmitted for a particular channel (commonly referred to as a "premium channel") for a particular program (as in pay-per-view applications).

Once activated, this channel authorization feature may be disabled if the subscriber once again telephones a customer service representative and requests such disablement. To provide adequate security such that the channel authorization feature is not overridden by young viewers, suitable codes (such as personal identification numbers) may be used to verify the authenticity of a request to authorize the channel for viewing.

While the present invention has been particularly shown and described with reference to a preferred embodiment, it will be readily appreciated that various changes may be made without departing from the spirit and scope of the invention. For example, the EPG data need not be transmitted over a separate, distinct channel but, rather, may be multiplexed onto one or more, or all of the channels that are receivable by the television receiving apparatus. Also, although the television receiving apparatus illustrated in FIG. 1 has been described as being present in a set-top converter for cable or direct satellite broadcast distribution systems, or may be provided directly in a television receiver or video recorder, it is understood that such apparatus may be disposed in a separate stand-alone unit of the type which has been proposed in conjunction with receiving and displaying electronic program guides. Still further, although the preferred criteria for inhibiting a television channel from being displayed is rating data, it will be appreciated that other criteria may be used, such as whether the subscriber is authorized to receive or de-scramble a particular channel, whether the subscriber is located in a particular geographic area, etc.

It is intended that the appended claims be interpreted as including the embodiment discussed above, those various alternatives which have been described and all equivalents thereto.

What is claimed:

1. A method of selectively inhibiting television receiving apparatus from displaying those channels which are not authorized for viewing, comprising the steps of:

storing channel authorization codes associated with channels that are receivable by said television receiving apparatus, said authorization codes indicating whether television programs transmitted on a channel are authorized to be received by said television receiving apparatus;

selecting a next channel to display a television program that is received on said next channel in response to a user input;

reading the authorization code associated with said next channel to determine if said next channel is authorized for viewing;

inhibiting said television receiving apparatus from displaying the television program on said next channel and automatically selecting another channel that is authorized for viewing if it is determined that said next channel is not authorized for viewing, and displaying the television program on said other channel; and displaying the television program on said next channel if it is determined that said next channel is authorized for viewing.

2. The method of claim 1 wherein said step of automatically selecting another channel if it is determined that said next channel is not authorized for viewing comprises: (a) selecting another channel, (b) reading the authorization code associated with said other channel to determine if said other channel is authorized for viewing, (c) inhibiting said television receiving apparatus from displaying the television program received on said other channel if it is determined that said other channel is not authorized for viewing, and (d) repeating steps (a) through (c) until the other channel which is selected is authorized for viewing.

3. The method of claim 1 wherein the step of selecting said next channel includes operating a channel up button or a channel down button on a channel selector operable with said television receiving apparatus.

4. The method of claim 3 wherein the step of selecting said next channel further includes the step of incrementing a channel number when said channel up button is operated, thereby identifying said next channel.

5. The method of claim 3 wherein the step of selecting said next channel further includes the step of decrementing a channel number when said channel down button is operated, thereby identifying said next channel.

6. Apparatus for selectively inhibiting a television receiving device from displaying those channels which are not authorized for viewing, comprising:

means for storing channel authorization codes associated with channels that are receivable by said television receiving device, said authorization codes indicating whether television programs transmitted on a channel are authorized to be received by said television receiving device;

means for selecting a next channel to display a television program that is received on said next channel in response to a user input;

means for reading from the storing means the authorization code associated with said next channel to determine if said next channel is authorized for viewing;

means for displaying the television program on said next channel if it is determined that said next channel is authorized for viewing; and means for inhibiting said television receiving device from displaying the television program on said next channel and for operating the selecting means to automatically select another channel that is authorized for viewing if it is determined that said next channel is not authorized for viewing, and causing the displaying means to display the television program on said other channel.

7. The apparatus of claim 6 wherein the selecting means includes a channel selector having a channel advance button.

8. The apparatus of claim 7 wherein the selecting means further includes channel counting means for providing a channel number to identify said next channel and means for incrementing said channel counting means when said channel advance button is operated.

9. The apparatus of claim 7 wherein the selecting means further includes channel counting means for providing a channel number to identify said next channel and means for decrementing said channel counting means when said channel advance button is operated.

* * * * *